United States Patent
Lee et al.

(10) Patent No.: US 7,584,549 B2
(45) Date of Patent: Sep. 8, 2009

(54) TAPE MEASURES PROVIDING ACCESS TO THE SPOOLED BLADE

(75) Inventors: Barry Howard Lee, Rayleigh (GB); Michael John Levick, Southend-on-Sea Essex (GB); Stanley James Burton, Rayleigh (GB)

(73) Assignee: Fisco Tools Limited, Rayleigh Essex (GB)

( * ) Notice: Subject to any disclaimer, the term of this patent is extended or adjusted under 35 U.S.C. 154(b) by 69 days.

(21) Appl. No.: 10/591,691

(22) PCT Filed: Mar. 2, 2005

(86) PCT No.: PCT/GB2005/000778

§ 371 (c)(1),
(2), (4) Date: Jul. 10, 2007

(87) PCT Pub. No.: WO2005/085747

PCT Pub. Date: Sep. 15, 2005

(65) Prior Publication Data

US 2007/0277390 A1    Dec. 6, 2007

(30) Foreign Application Priority Data

Mar. 3, 2004   (GB) ................................. 0404791.6

(51) Int. Cl.
*G01B 3/10* (2006.01)
(52) U.S. Cl. .......................................... 33/769; 33/761
(58) Field of Classification Search .................. 33/755, 33/759, 761, 765, 766, 767, 769; 248/379, 248/379.2, 393.395; D10/72
See application file for complete search history.

(56) References Cited

U.S. PATENT DOCUMENTS

| 2,207,277 | A | * | 7/1940 | Volz | 33/769 |
| 2,505,653 | A | * | 4/1950 | Shillman | 242/398 |
| 2,634,919 | A | * | 4/1953 | Hans | 242/405 |
| D229,856 | S | * | 1/1974 | Quenot | D10/72 |
| 4,023,277 | A |   | 5/1977 | Fizer |  |
| 4,200,983 | A |   | 5/1980 | West et al. |  |
| 4,363,171 | A | * | 12/1982 | Scandella | 33/769 |
| 4,649,649 | A | * | 3/1987 | Fain | 33/761 |
| 6,053,447 | A |   | 4/2000 | Omri |  |
| 6,550,155 | B1 |   | 4/2003 | Hsu |  |

FOREIGN PATENT DOCUMENTS

| GB | 682714 |   | 11/1952 |
| GB | 2160500 | A * | 12/1985 |
| JP | 63256802 | A * | 10/1988 |
| JP | 2005172514 | A * | 6/2005 |
| JP | 2005181024 | A * | 7/2005 |
| JP | 2005289560 | A * | 10/2005 |
| WO | WO 2005121694 | A1 * | 12/2005 |

* cited by examiner

*Primary Examiner*—R. Alexander Smith
(74) *Attorney, Agent, or Firm*—Buchanan Ingersoll & Rooney PC

(57) ABSTRACT

A tape measure having a case, in which is a spooled concave measuring blade, the blade being extendable from the case via an opening, the tape measure having a spring which acts to urge the blade back into its spooled configuration, and an end piece at the free end of the measuring blade, wherein the tape measure further comprises at least one aperture in the casing to allow direct access to the spooled blade.

8 Claims, 4 Drawing Sheets

TAPE MEASURES PROVIDING ACCESS TO THE SPOOLED BLADE

This application is a National stage filing under 35 U.S.C. §371 of International Application No. PCT/GB2005/000778, filed on Mar. 2, 2005, which in turn claims priority to Great Britain Application No. 0404791.6, filed Mar. 3, 2004, the entire contents of which are incorporated herein by reference.

The present invention relates to tape measures, and in particular to tape measures having a spooled concave measuring blade and a return spring.

Known tape measures include tape measures having a concave measuring blade which is spooled within a casing. Being concave enables the blade to 'stand-out' from the casing when extended therefrom. The measuring blade, which is usually metallic, has at its free end, an end piece. The end piece comprises a part which lies adjacent the measuring blade, an "attachment" portion, and which is usually slidably attached to the measuring blade. The end piece has a further part, a "hook" portion, arranged perpendicularly to the attachment portion, which serves three functions.

Firstly, it prevents the free end of the measuring blade from being spooled into the casing, i.e. it prevents the measuring blade from being completely wound onto the spool. Secondly, the end piece allows the end of the measuring blade to be butted up against a workpiece for 'inside' measurements. Thirdly, it enables the end of the measuring blade to be hooked over the end of a workpiece to allow for measuring a distance on a workpiece by a single person.

In many current tapes the end hook portion extends below the base of the tape casing. This leaves the end hook vulnerable to damage, and consequent loss of accuracy, if dropped. This also leads to the hook portion becoming unintentionally caught on an object and extending the blade from the casing. In most other current tapes the hook portion does not extend a great distance from the measuring blade. Although this avoids some of the mentioned problems, this structure, however, presents its own problem, in that it is difficult to extend the blade from the casing by hooking the hook portion over the end of the workpiece when the measuring blade is fully spooled, as the small part of the hook portion which extends below the bottom edge of the casing is not sufficient to provide a firm grip on the end of the workpiece. If the user is holding the tape measure in one hand, and for example, holding the workpiece in the other hand, they would have to resort to other means for extending the blade from the casing. Many users achieve this by gripping the hook portion in their teeth and pulling the end piece away from the casing, thus extending the blade, before applying the brake to the blade, and transferring the tape to the workpiece, all this before continuing with the measuring process.

Some known tape measures address this issue providing extended hook portions on the end piece, but these suffer the disadvantage mentioned above that the longer the hook portion, the greater the risk of it becoming unintentionally caught on objects in use and the bulkier the tape.

An alternative solution to the difficulties discussed above is described in U.S. Pat. No. 6,550,155 where a tape measure without a central spring is wound on a spool such that when the spool is unlocked the blade is automatically extended. This has the disadvantage of requiring a two handed operation to wind the blade back in.

One aim of the present invention is to provide a tape measure which can satisfactorily be used single-handed, especially when it is desired to hook the end piece onto a workpiece, without the disadvantages of the prior art.

Accordingly a first aspect of the present invention provides a tape measure having a case, in which is a spooled concave measuring blade, the blade being extendable from the case via an opening, the tape measure having a spring which acts to urge the blade back into its spooled configuration, and an end piece at the free end of the concave measuring blade, wherein the tape measure further comprises at least one aperture or window in the casing to allow direct access to the spooled blade, by which access the user can advance the blade by applying a force directly to the spooled concave measuring blade.

A tape measure according to the invention enables a user to extend the blade without pulling on the end piece, and enables single-handed use of a tape measure and avoids the use of an extended hook portion of the end piece.

It is preferred there is at least one aperture or window in the casing, although there may be two or more such apertures. These apertures would normally be provided in the edges of the cases. Tape measures of the present invention can be defined as having front and back faces, which faces are positioned either side of the spooled measuring blade. These two faces are linked by edges of the case, which can be defined as follows. The bottom edge of the case is that which runs parallel to the direction of extension of the measuring blade from the case. The other edges of the tape may be arranged such that the tape is cuboid, but of particular interest in the present application are edges which to some degree follow the circumference of the measuring blade when completely spooled. In such a case, at least two of the edges may merge into one another without a clear distinction between them. The front edge of a tape is usually the edge from which the blade is extended, opposite to which is the rear edge. The top edge is opposite the bottom edge.

It is particularly convenient for at least one aperture to lie on either the front or top edges of the casing, i.e. on the edge of the casing which is directly above the opening from which the blade extends, or the edge of the casing which is generally parallel to the direction of the extension of the blade, but spaced from the extending blade.

The length of this at least one aperture, the length being measured around the circumference of the spooled blade, is preferably at least 3 cm, more preferably at least 5 cm. Such a distance allows the blade to be advanced by the users in a single motion before the hook portion of the end piece is hooked over the end of a workpiece.

In a particularly preferred embodiment of the invention, the portions of the casing which have apertures in follow the circumference of the spool on which the measuring end is spooled. This allows easy access for the user to the spooled blade.

The width of the at least one aperture is preferably less than the width of the spooled measuring blade, but may be wider.

In addition to the aperture(s), the tape may additionally comprise means for directly driving at least one of the discs or the spool on which the measuring blade is spooled in a direction to extend the blade from the casing.

In some tape measures, the spooled blade is mounted on a pair of discs, whilst in other tape measures, the spooled blade is mounted on a one piece spool mounting or a coupled spool and cover. The term discs as used herein refers either to the discs on which the blade is spooled, or one of the discs which is part of the spool on which the blade is spooled.

These driving means may be provided by extending one of the discs such that it extends through an aperture in the case, i.e. the diameter of one of the discs is such that at least part of its circumferential edge is exposed outside the tape measure case.

Alternatively, the driving means may comprise a thumbwheel mounted in the case, which thumbwheel can directly drive one of the discs or the spool on which the blade is spooled. The thumbwheel may be located such that it is always linked to the disc or spool, so that when one rotates, the other also rotate. In alternative embodiments, the thumbwheel may be movable between two positions, in one of which it is linked to the disc or spool, and in the other of which it is not linked to the disc or spool. Typically, the thumbwheel would be biased to the non-linked position, for example, by a coil or leaf spring, such that it may be linked to the disc by the application of gentle pressure.

In either of the above described embodiments, the thumbwheel may engage the disc or spool without any intermediate, by way of meshing teeth on the thumbwheel and on the disc or spool. Alternatively, the engagement may be by way of one or more intermediate gear cogs. Such an engagement arrangement can allow for a gearing advantage to be provided between the thumbwheel and the disc or spool.

The tape measure of the present invention may have further features which are typically found in tape measures, such as a cam brake which acts directly or indirectly on the measuring blade.

Preferred embodiments of the present invention will now be described, by way of example only, with reference to the accompanying drawings, in which.

Figure 1:
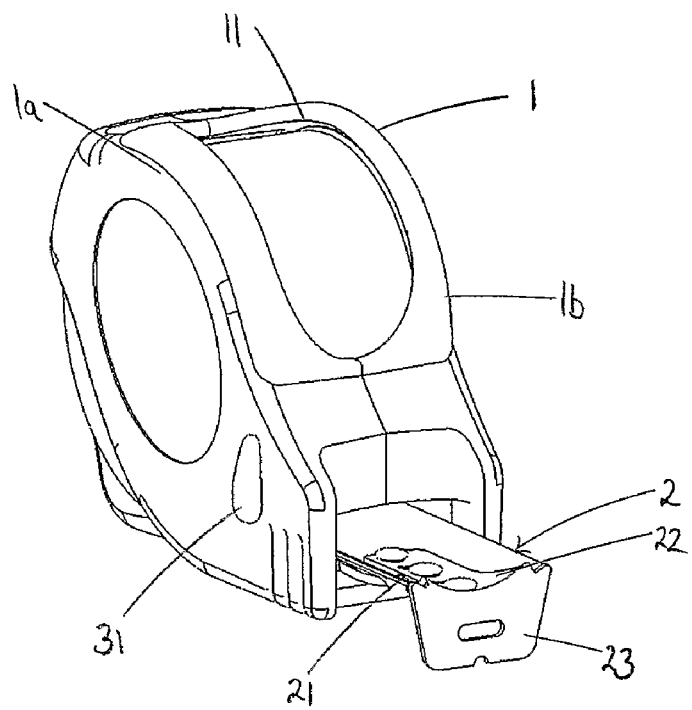
FIG. 1 is a perspective view from the front of a tape measure according to an embodiment of the invention.
Figure 2:
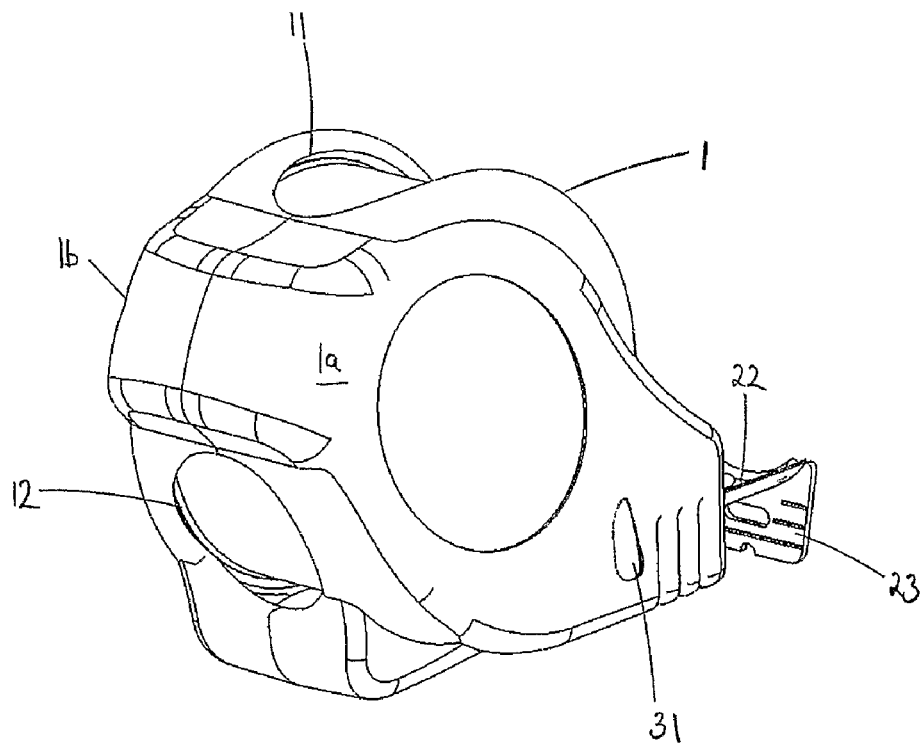
FIG. 2 is a perspective view from behind of the tape measure of FIG. 1.

FIGS. 1 and 2 show a complete tape measure which has a case 1, which is made from injection moulded plastics material, such as high impact ABS. The casing 1 is made of two parts 1a and 1b (only one part (1b) being shown in FIGS. 3 and 4), the tape measure being constructed by subsequently fitting the two parts together by connection points 16, 17 and 18.

The tape measure includes a central mounting post 13 which post projects from a central region of the inner surface of the side wall of one part of the case, 1b. During assembly of the tape measure, the return spring (not shown) is connected to the centre post 13. The measuring blade 2 is connected to the other end of the return spring. The concave measuring blade 2 is then spooled onto discs 24 which are rotatably mounted on the centre post 13.

In use, the blade 2 is drawable from the tape measure via opening 14 in the case 1. The blade passes over a blade engagement wall (brake pad) 33 on its way out of the case. At the end of the blade is an end piece 21, which comprises attachment portion 22 running adjacent the blade 2, and a hooking portion 23, which extends perpendicularly to attachment portion 22. This hook portion prevents the blade 2 being completely spooled on the discs 24 by the return spring (not shown).

Figure 3:
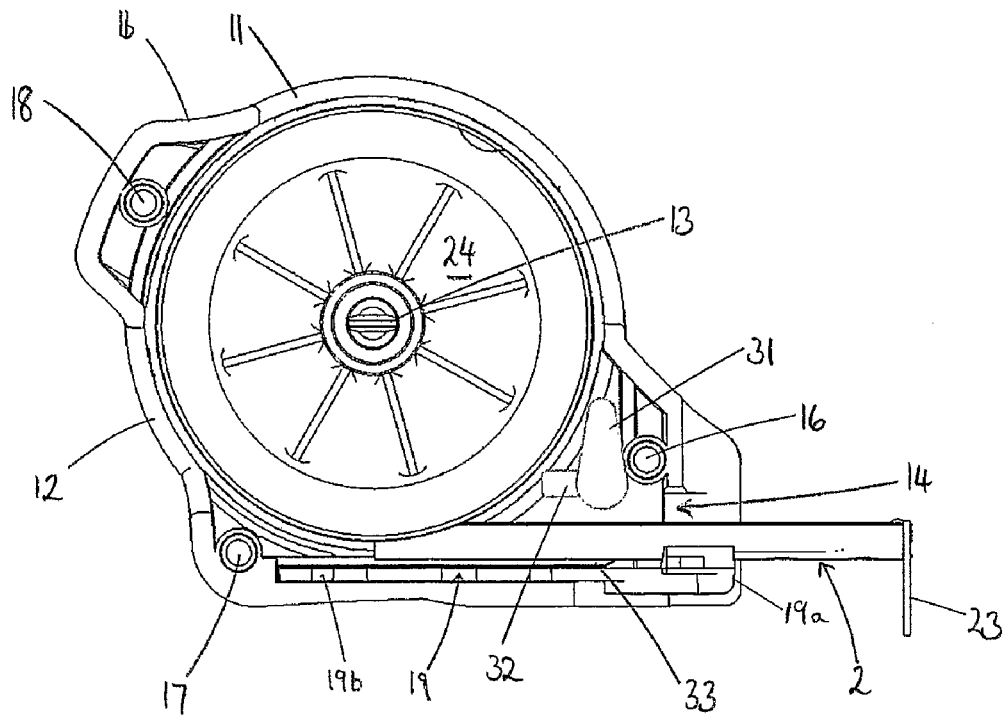
FIG. 3 is a schematic partial section view of one half of the tape measure of FIG. 1.
Figure 4:
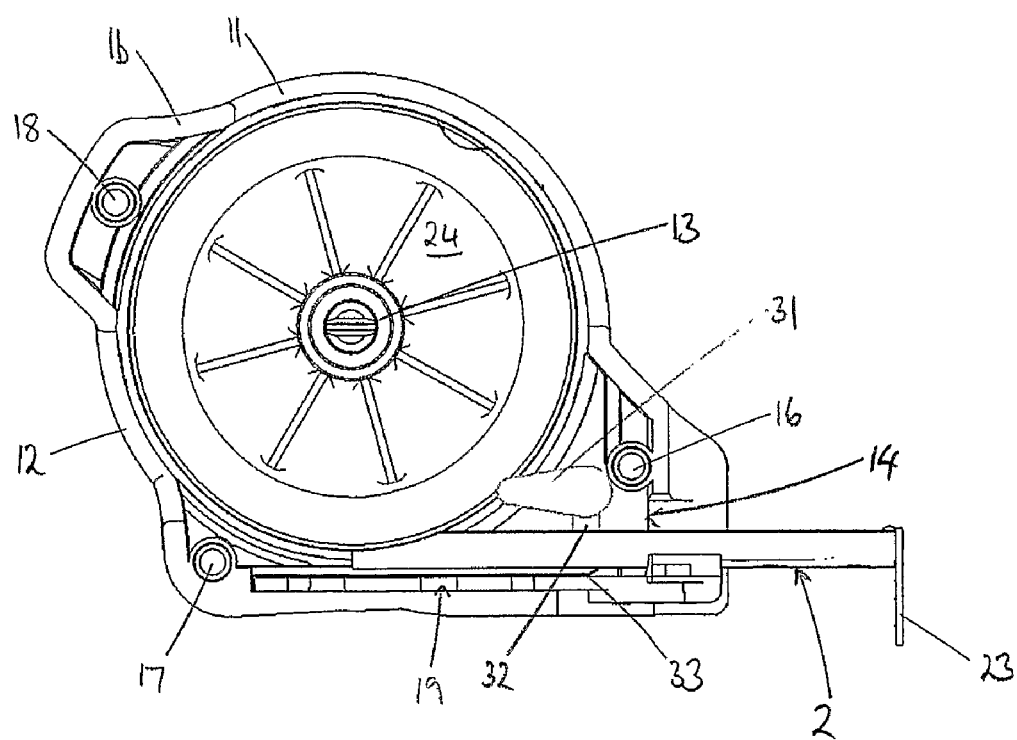
FIG. 4 is a schematic partial section view of one half of the tape measure according to FIG. 1.

The tape measure includes an optional brake which comprises handle 31 mounted on the outside of the front half of the casing 1a, and a cam 32 mounted on the inside of the casing 1. The handle 31 can alternatively be mounted on the outside of the back half of the casing 1b. The brake handle 31 and cam 32 are pivotable about an axis such that the cam 32 can be distanced from the blade 2 as shown in FIG. 3, or be rotated into engagement with the blade as shown in FIG. 4, so as to trap the blade 2 against the brake pad 33. This enables the blade to be braked in any position for easy measurement.

To prevent damage to the casing 1 and end piece 21 when the blade 2 is being returned to its spooled position, a bump stop 19 is provided in the lower wall of the casing 1. This bump stop comprises an end surface 19a and a spring portion 19b which absorbs the force of the returning end piece 21.

The casing 1 has two apertures in its edges (side walls), 11 and 12. Aperture 11 is located such that when the tape measure is gripped in a user's hand their thumb lies on top of this aperture, and can be used to extend the blade 2 from the casing 1 via opening 14 without applying a direct force to the end piece 21. This extension is accomplished by the user's thumb engaging the spool tape measure at the bottom end of aperture 11, and drawing their thumb, or other digit, backwards towards the back end of the aperture 11.

A smaller aperture 12 is provided opposite aperture 11. The aperture 11 is located in a ergonomically correct position whilst working on a bench, whereas the aperture 12 is more accessible whilst working overhead.

These apertures may serve other purposes than providing means for extending the tape measure from the casing. For example, information could be provided for printing on the reverse surface of the blade 2 (i.e. the surface not carrying the measuring marks) which would then be visible in the apertures. This information can be conversion tables, weights and measures, jokes, advertising or branding, which may be indexed by reading the relevant length at the mouthpiece. For instance 3.5 m to 4 m could conversion tables, and 4 m to 4.5 m could be 'solution of right angled triangles—tan, sin, cosin etc'.

In addition, the apertures 11 and 12 allow the return progress of the blade 2, carried by the return spring (not shown), to be slowed or halted, for example for taking measurements, by using thumb pressure. This can reduce the need for buttons or levers at various places on the case, which can be difficult to find and operate and give less control.

By provision of the apertures 11 and 12, the tape casing 1 is made lighter, and is also cheaper to manufacture as it uses less plastics material.

Figure 5:
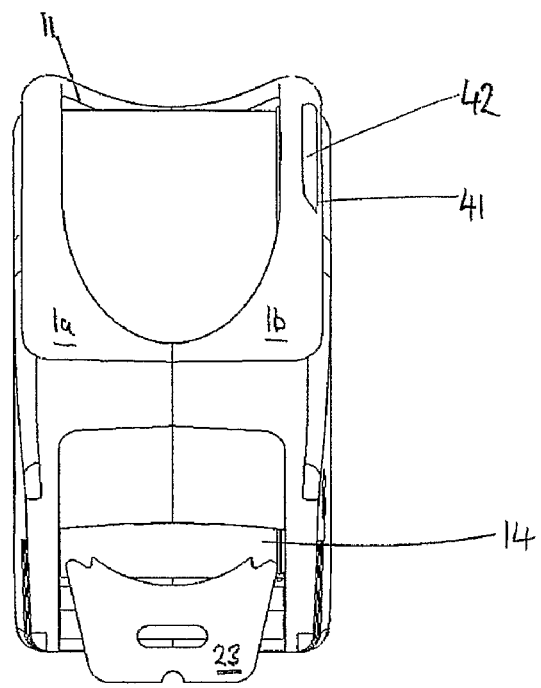
FIG. 5 is a view of the front edge of an alternative tape measure according to an embodiment of the invention.
Figure 6:
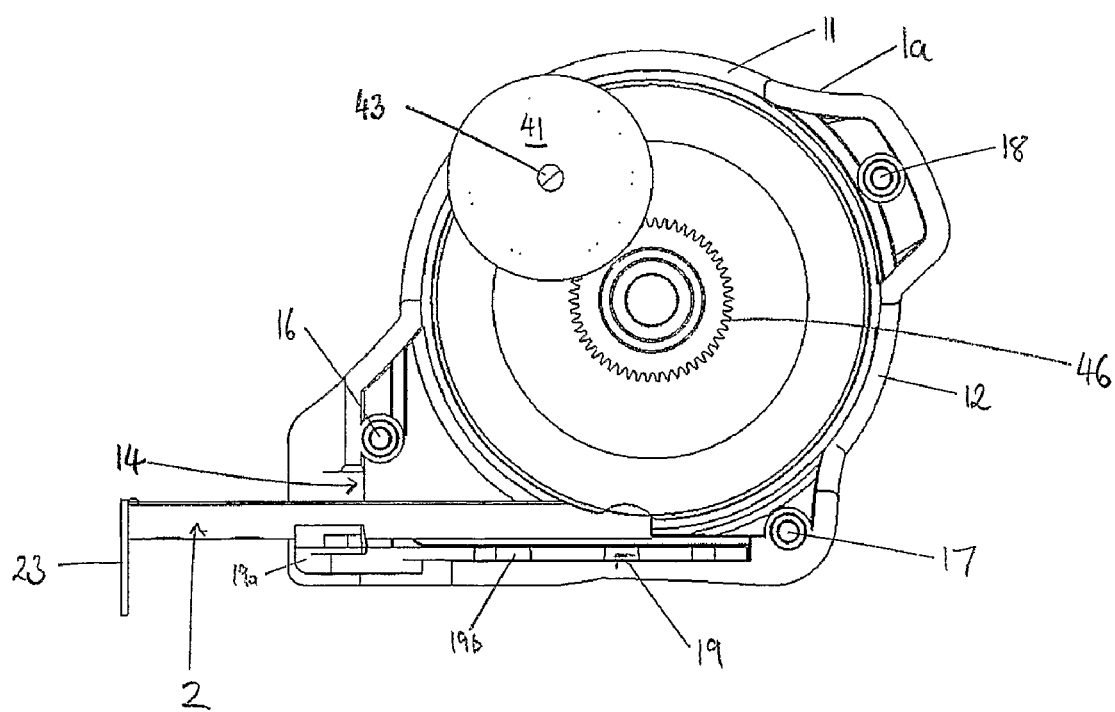
FIG. 6 is a schematic partial section of one half of the tape measure of FIG. 5.
Figure 7:
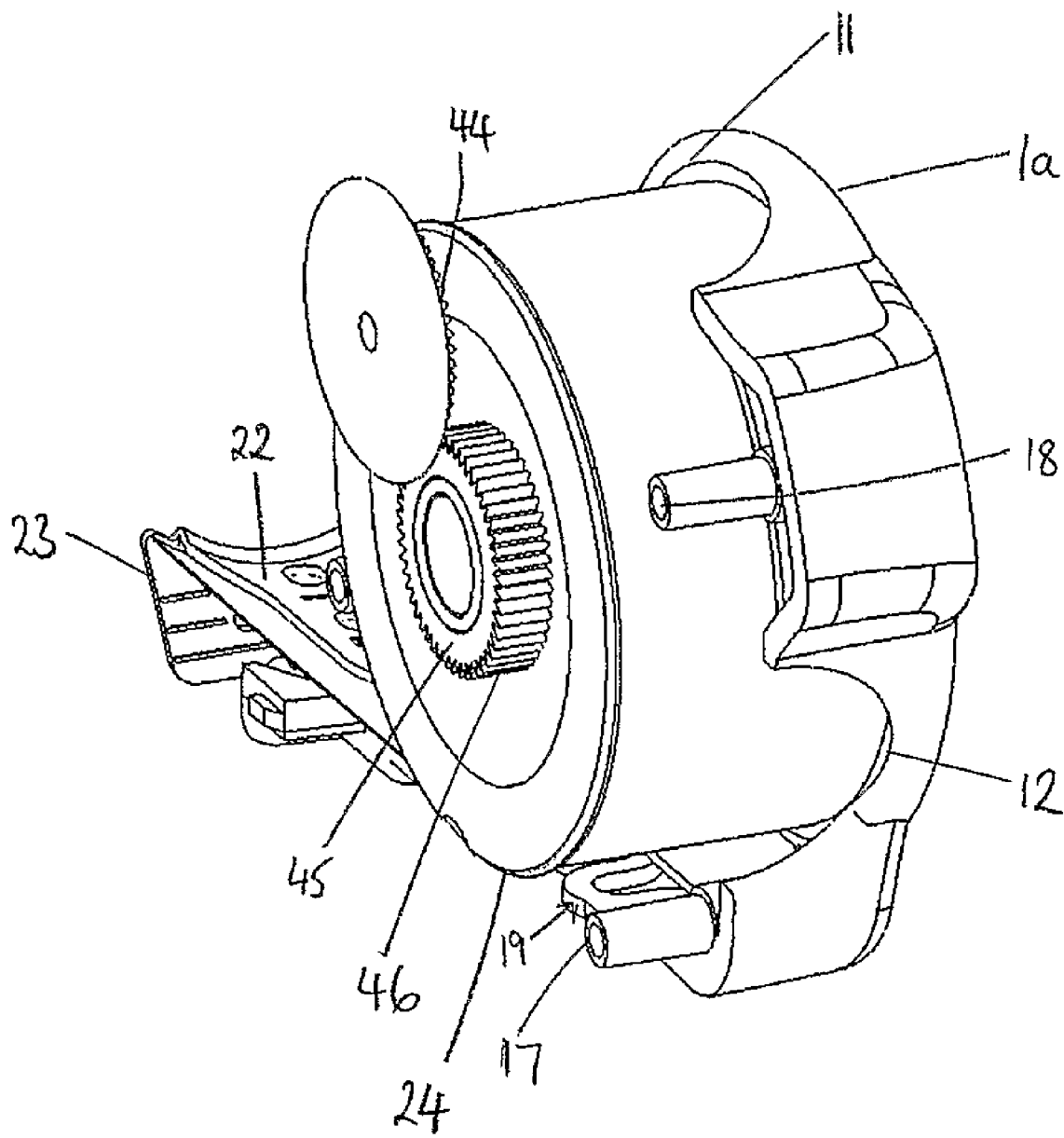
FIG. 7 is a perspective view of the half of the tape measure according to FIG. 6.

FIG. 5 shows a complete tape measure which shares many of the features of that of FIGS. 1-4, and which are labelled with the same reference numerals. In addition, the tape measure has an aperture 42 in the front part 1b of the casing 1, through which protrudes part of a thumbwheel 41. This thumbwheel is rotatably mounted on a post 43, which is located on the inside of the front part 1b of the casing 1. FIGS. 6 and 7 show the tape measure with the front part 1a of the casing 1 removed, but with the thumbwheel 41 and its mounting post 43 retained.

As shown in FIGS. 6 and 7, the thumbwheel has a circular projection bearing cog teeth 44 which mesh with cog teeth 46 on a circular projection 45 on one of the spooling discs 24. Thus, rotation of the thumbwheel 41 in the appropriate direction causes rotation of the spooling disc 24 and extension of the measuring blade 2 through the opening 14 in the case 1. The thumbwheel 41 can be used to slow or halt the return progress of the blade 2, caused by the return spring (not shown).

In an alternative embodiment the mounting post 43 is movable with respect to the front part 1a of the casing 1, such that the meshing engagement of cog teeth 44 and 46 is not permanent. The mounting post 43 is biased by a coil or leaf spring into a non-engaged position, and can be caused to be in an engaged position by the application of gentle pressure to the thumbwheel 41. Thus, the thumbwheel 41 does not spin in normal use of the measure.

Although, the tape measure shown in FIGS. 5-7 has apertures 11 and 12, these need not be provided in a tape measure having a thumbwheel.

The invention claimed is:

1. A tape measure having a case, in which is a spooled concave measuring blade, the blade being extendable from the case via an opening, the tape measure having a spring which acts to urge the blade back into its spooled configuration, and an end piece at the free end of the measuring blade, wherein the tape measure further comprises at least one aperture in the casing to allow direct access to the spooled blade;
    wherein the at least one aperture is provided in an edge of the case, the length of the at least one aperture, the length being measured around the circumference of the spooled blade, is at least 3 cm, and the width of the at least one aperture is less than the width of the spooled measuring blade.

2. A tape measure according to claim 1, wherein there are at least two apertures in the casing.

3. A tape measure according to claim 1, wherein the length of the at least one aperture is at least 5 cm.

4. A tape measure according to claim 1, wherein the at least one aperture extends along at least a portion of the circumference of the spool.

5. A tape measure having a case, in which is a spooled concave measuring blade, the blade being extendable from the case via an opening, the tape measure having a spring which acts to urge the blade back into its spooled configuration, and an end piece at the free end of the measuring blade, wherein the tape measure further comprises at least one aperture in the case, and a plurality of disks, the blade being spooled over the disks; wherein at least one of the disks extends through an aperture in the case for driving the blade in a direction to extend the blade from the casing.

6. A tape measure having a case, in which is a spooled concave measuring blade, the blade being extendable from the case via an opening, the tape measure having a spring which acts to urge the blade back into its spooled configuration, and an end piece at the free end of the measuring blade, wherein the tape measure further comprises a thumbwheel mounted in the case, said thumbwheel drives the blade in a direction to extend the blade from the casing.

7. A tape measure according to claim 6, further comprising a spool or a plurality of disks for receiving the measuring blade thereon, wherein the thumbwheel is located such that it is always linked to the disc or the spool.

8. A tape measure according to claim 7, wherein the thumbwheel directly engages the disc or the spool.

* * * * *